May 12, 1959
I. MILLER
2,886,282
INSERT SEAL KELLY COCK
Filed May 5, 1954
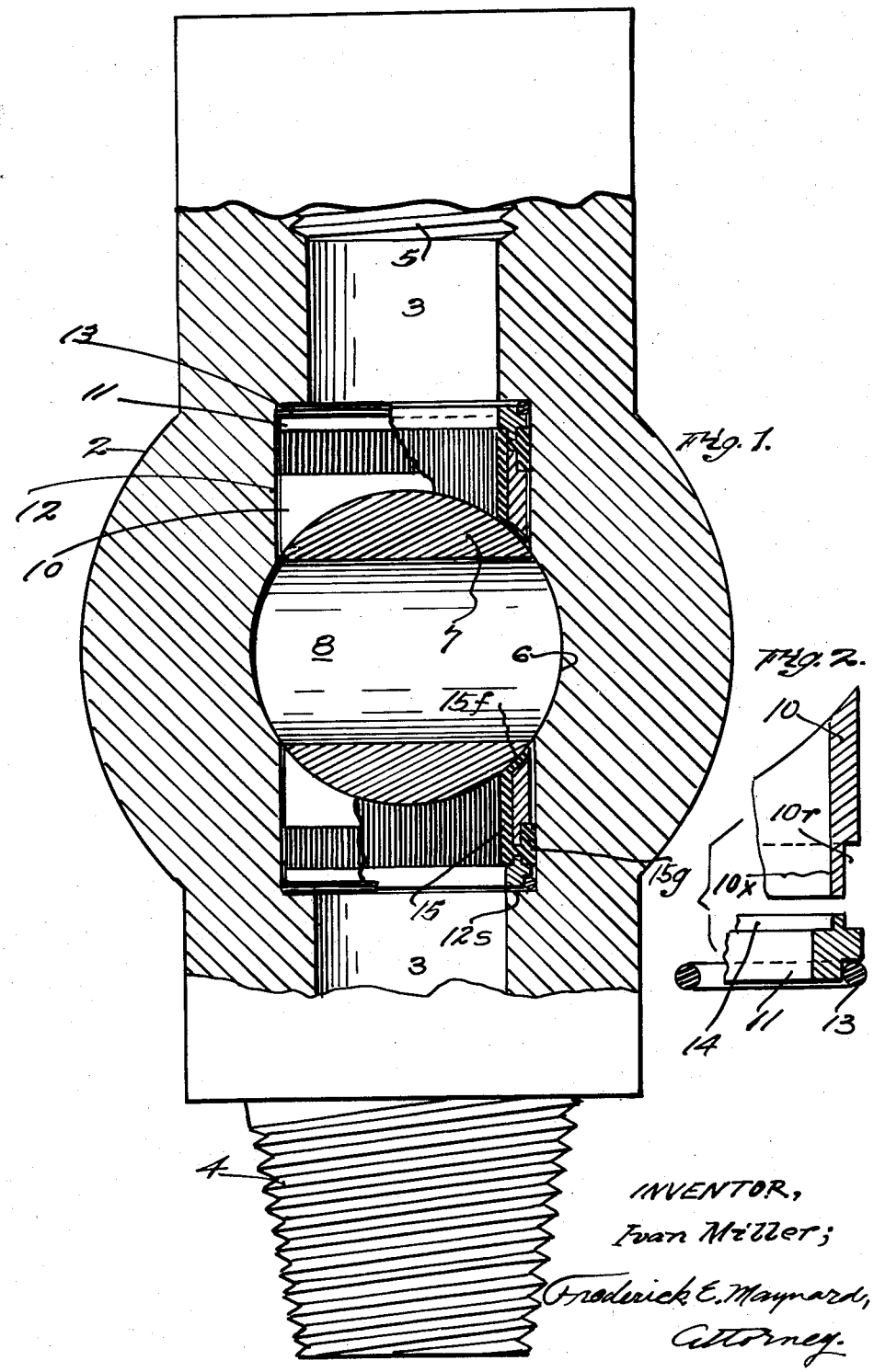
INVENTOR,
Ivan Miller;
Frederick E. Maynard,
Attorney.

United States Patent Office 2,886,282
Patented May 12, 1959

2,886,282
INSERT SEAL KELLY COCK

Ivan Miller, Fullerton, Calif., assignor to Shaffer Tool Works, Brea, Calif., a corporation of California Application May 5, 1954, Serial No. 427,816

7 Claims. (Cl. 251—172)

This invention is in the class of deep well apparatus valves and is an improved kelly cock.

These cocks are subjected to heavy duty in two directions in that the casing element must be extra thick to be able to sustain the great load of a long string of heavy drill pipe and attached tools, and, second, the operative valve closure turning in the casing must be effectively packed to withstand high degrees of motive fluid from above or high natural well pressure fluid.

The instant invention is directed toward and has the object, in one instance, of providing a highly efficient, simple, practical, substantial and easily inserted packer unit of which one is mounted in countersunk position in the valve casing at diametrically opposite sides of the rotary closure or plug, as the element will hereafter be referred to.

Further, an intent of the invention is to provide a packing unit of few and simple members, of low cost, and of such a construction that far ends of the unit are forced solidly to sealably seat on respective, contiguous areas of the plug and of the casing in which the unit is installed.

The invention resides in certain advancements in this art as set forth in the ensuing disclosure and has, with the above, additional objects and advantages as hereinafter developed, and whose construction, combinations and details of means and manner of operation will be made manifest in the following description of the herewith illustrative embodiment; it being understood that modifications, variations, adaptations and equivalents may be resorted to within the scope, spirit and principles of the invention as it is claimed in conclusion hereof.

Reference is made to Patent 2,418,404, Greenlee, as showing a kelly cock of the class here concerned.

The drawing:

Figure 1 is an axial section of the valve; showing the closure plug with its flow port in shut-off position in the casing. Figure 2 is a sectional detail of co-ordinate, inner-end and outer-end collar elements of a packer unit.

The structure includes a substantial, bulbous casing 2 having an axial passageway 3 ending in nipple and box portions 4 and 5, respectively, to threadedly connect to a kelly bar and other fittings not here shown. Transversely intersecting the passageway 3 is a large cylindrical bore 6 whose axis is radial to the axis of the said passageway and rotatively mounted in the bore 6 is a complementary closure plug 7 provided with a flow port 8 turnable into coaxial register with the passageway for free flow of fluid through the kelly cock.

This invention is distinguished in that there is counter sunk in the wall of the casing passageway a pair of duplicate, diametrically opposite and reversely positioned packing units, as clearly shown in Fig. 1.

Each packing unit embodies an elongate inner-end metal collar element and a coaxial, outer-end metal collar element respectively 10 and 11, longitudinally opposite each other and freely fitting adjacent counter bore wall 12 provided in the casing.

Fig. 2 shows the outer corner of the outer collar element 11 as rebated to receive a complementary O-type packing ring 13, and the inner, transverse end of the element 11 has an outstanding bead 14 positioned approximately in the center of each end. The collar element 10 is radially thinner than the element 11 and its outer end has an annular lip 10x opposite to the bead 14 to form an external rebate 10r.

The collar element 10 encompasses a rubber or the like packing band 15 having an inner end fin 15f lodged between the inner end face of the element 10 and adjacent surface of the rotary plug to make an effective seal. The outer end of the packing band 15 envelopes the bead 14 and also the lip 10x by way of a girdle 15g which is about flush with the periphery of the element 10; whereby to interlock the elements 10 and 11 and make a unitary assembly of a packing unit; for handling, and for bodily insertion or removal as to the counter bore in the casing.

As both packing devices operate in the same manner, a description of one will be made to bring out their functioning. Using the lower device in connection with this matter, it will be assumed that pressure is present in the passage 3. Due to the fact that the lower end of the collar 11 is spaced somewhat from the shoulder 12s by the packing ring 13, the above referred to pressure will be effective against said lower end of collar 11, and will urge the packing device toward the plug 7, so that the fin 15f will be in tight sealing engagement therewith. The pressure will not bypass the device because of the packing ring 13 and the girdle. This arrangement provides a controlled area at the outer end of the packing device and a balancing of pressures is secured.

It will therefore be seen that when high pressure is set up in the passageway of the cock from either direction one or the other bands of the units will take the pressure and being under compression will operate to set its packing ring 13 and its fin 15f hard against the engaged areas of the plug and a respective landing shoulder 12s of its counter bore. Also, the two inserted packing units can take sealing pressure at the same time from the pressure fluid.

The periphery of the collar element 10 is cylindric on the axis of the bore 3 of the casing while the inner end of this element is cylindric on the axis of the closure plug and presents in end view a complete circle constantly sealing on the plug and preventing grit-laden fluid from getting to the wall face of bore 6.

What is claimed is:

1. A kelley-cock, comprising: a casing having a flow passage therethrough including a plug receiving part and enlarged cylindrical packing receiving portions extending axially of the passage from said part, each enlarged portion having a shoulder at the outer end; a closure plug rotatably received in said plug receiving part for controlling flow through said passage; and a packing unit in each of said enlarged portions, each unit comprising a packing band of resilient material, said packing band comprising a cylindrical body and an annular girdle spaced outwardly of the outer cylindrical surface of said body and connected therewith by a relatively narrow band to thereby provide oppositely extending annular recesses between said body and said girdle, said girdle sealingly engaging the wall of the packing receiving portion in which said packing unit is disposed; an inner metal collar disposed about the inner end of said packing band and having the outer edge rabbeted to provide an annular lip extending longitudinally of said collar and received within the adjacent recess between the girdle and body of the packing band, the opposite end of said collar being shaped to conform with the adjacent surface of the plug; a fin at the inner end of said packing band body extending outwardly between the inner end of said collar and the adjacent surface of said plug; an outer collar at the opposite end of said body and having the outer corner thereof rabbeted to provide a recess; an annular bead on the inner end of said collar, said bead being aligned with the lip of the first mentioned collar and received in the opposite annular recess of the packing band; and a packing ring in the recess in the outer corner of the outer collar, said packing ring engaging the adjacent cylindrical wall portion of the enlarged passage portion and also engaging the adjacent shoulder and spacing the outer end of the outer packing ring from said shoulder to thereby provide an effective fluid pressure area at the outer end of the packing unit whereby fluid pressure urges the packing unit into sealing engagement with the closure plug.

2. In a kelley-cock: a casing having a flow passage therethrough including a plug receiving part and a packing receiving portion extending axially of the passage from said part, said portion having a shoulder at its outer end; a closure plug rotatably received in said plug receiving part for controlling flow through said passage; and a packing unit in said portion, said unit comprising a packing band of resilient material, said packing band comprising a body part and a girdle spaced outwardly of the outer surface of said packing body part and connected therewith by a relatively narrow band to thereby provide oppositely extending recesses, said girdle sealingly engaging the wall of said packing receiving portion; an inner collar disposed about the inner end of said body part and having an outer end portion forming a lip extending longitudinally of said collar and received within the adjacent recess between the girdle and body part of the packing band, the opposite end of said collar being formed in conformity with the adjacent surface of the plug, said body part having an inner end fin extending outwardly between the inner end of said collar and the adjacent surface of said plug; an outer collar having the outer corner thereof recessed; an annular bead on the inner end of said collar, said bead being received in the opposite recess of the packing band; and a packing element received in the recess of the outer collar, said packing element engaging the adjacent wall portion of the packing receiving portion of said passage and also engaging the adjacent shoulder and spacing the outer end of the outer packing ring from said shoulder to thereby provide an effective fluid pressure area at the outer end of the packing unit whereby fluid pressure urges the packing unit into sealing engagement with the closure plug.

3. A packing unit for a kelley-cock having a flow passage and a rotatable closure plug for controlling flow through said passage, said packing unit being adapted to be inserted in the flow passage in sealing engagement with the walls of said passage and said closure plug and comprising: a packing band of resilient material, said packing band comprising a cylindrical body and an annular girdle spaced outwardly of the outer cylindrical surface of said body and connected therewith by a relatively narrow band to thereby provide oppositely extending annular recesses; a metal collar disposed about one end of said packing band and having an annular lip at the outer end, said lip extending longitudinally of said collar and received within the adjacent recess between the girdle and said cylindrical body, the opposite end of said collar being formed in conformity with a surface of said plug, said packing band having a fin extending outwardly over the adjacent end of said collar; a second collar at the opposite end of said body and having the outer corner thereof recessed; an annular bead on the inner end of said second collar, said bead being aligned with the lip of the first mentioned collar and received in the opposite annular recess of the packing band; and a packing ring received in the recess of the outer collar.

4. In a packing unit for a kelly-cock having a flow passage and a closure plug for controlling flow through said passage, said packing unit being adapted to be inserted in the flow passage in sealing engagement with the walls of said passage and said closure plug and comprising: a packing band of resilient material, said packing band comprising a tubular body having a girdle spaced outwardly of the outer surface of said body and connected therewith by a relatively narrow web to thereby provide oppositely extending annular recesses; a collar disposed about one end of said body and having a lip received within the adjacent recess between the girdle and said body of the packing band, the opposite end of said collar being formed for operable engagement with said plug, said body having an inner end fin extending over the adjacent end of said collar; a second collar having the outer corner thereof recessed; and an annular bead on the inner end of said second collar, said bead being received in the opposite recess of the packing band.

5. In a kelly-cock: a casing having a flow passage therethrough including a plug receiving part and a packing receiving portion extending axially of the passage from said part, said portion having a shoulder at its outer end; a closure plug operably received in said plug receiving part for controlling flow through said passage; and a packing unit in said portion, said packing unit comprising a packing band of resilient material, said packing band comprising a body part and an outwardly extending flange part; an inner collar disposed about the inner end of said body part and having at least a portion of the outer end engageable with said flange, the opposite end of said collar being formed in conformity with the adjacent surface of the plug, said body part having an inner end fin extending outwardly between the inner end of said collar and the adjacent surface of said plug; an outer collar having the outer corner recessed; and a packing element received in said recess, said packing element engaging the adjacent wall portion of the packing receiving portion of the passage and also engaging the adjacent shoulder and spacing the outer end of the outer packing collar from said shoulder to thereby provide an effective fluid pressure area at the outer end of the packing unit whereby fluid pressure urges the packing unit into sealing engagement with the closure plug, the inner end of said outer collar engaging the flange of the resilient body of the packing band.

6. In a packing unit for a kelly-cock having a flow passage and a closure plug for controlling flow through said passage, said packing unit being adapted to be inserted in the flow passage in sealing engagement with the walls of said passage and said closure plug and comprising: a packing band of resilient material, said packing band comprising a tubular body having an outwardly extending flange intermediate the ends thereof; a collar disposed about one end of said body and having one end engaging said flange, the opposite end of said collar conforming to the shape of said plug, said body having an end fin extending over the last mentioned end of said collar; and a second collar on said band, said second collar having the outer corner thereof recessed for reception of a packing ring, the opposite end of said second collar engaging said flange of said packing band.

7. In a kelly-cock: a casing having a flow passage therethrough including a plug receiving part and a packing receiving portion extending axially of the passage from said part, a closure plug operably received in said plug receiving part for controlling flow through said passage, and a packing unit retained in said portion in sealing engagement with the walls of said passage and said closure plug, said packing unit comprising: a packing band of resilient material, said packing band comprising a tubular body; and an annular collar disposed radially outside of said body and having one end conforming to the shape of said plug, said body having an end fin attached to said body at the inner end only of said fin, the outer free end of said fin extending over said one end of said collar to permit said fin to sealingly engage said plug.

References Cited in the file of this patent

UNITED STATES PATENTS

| 2,418,404 | Greenlee | Apr. 1, 1947 |
| 2,529,412 | Parker | Nov. 7, 1950 |
| 2,599,774 | Ohls | June 10, 1952 |
| 2,605,994 | Borchardt | Aug. 5, 1952 |
| 2,606,738 | Glen | Aug. 12, 1952 |